United States Patent [19]

Netter

[11] Patent Number: 4,872,001

[45] Date of Patent: Oct. 3, 1989

[54] SPLIT SCREEN IMAGING

[75] Inventor: Zvi Netter, Haifa, Israel

[73] Assignee: Elscint Ltd., Haifa, Israel

[21] Appl. No.: 145,703

[22] Filed: Jan. 15, 1988

Related U.S. Application Data

[63] Continuation of Ser. No. 730,201, May 3, 1985, abandoned.

[30] Foreign Application Priority Data

May 25, 1984 [IL] Israel .................................. 71925

[51] Int. Cl.$^4$ .............................................. G09G 1/00
[52] U.S. Cl. ................................. 340/721; 340/723; 340/724
[58] Field of Search ............... 340/721, 723, 724, 731, 340/734; 364/521

[56] References Cited

U.S. PATENT DOCUMENTS

| | | | |
|---|---|---|---|
| 4,414,628 | 11/1983 | Ahuja et al. | 340/721 |
| 4,533,910 | 8/1985 | Sukonick et al. | 340/721 |
| 4,542,376 | 9/1985 | Bass et al. | 340/721 |

Primary Examiner—David K. Moore
Assistant Examiner—Jeffery A. Brier
Attorney, Agent, or Firm—Sandler & Greenblum

[57] ABSTRACT

A split screen imaging display system including interactive controls operating on random access memories for designating subdisplay images on a split screen basis. The interactive controls in conjunction with random access memories individually control each of the split screen subdisplay images with an independant set of parameters which are variable even during the imaging process.

3 Claims, 2 Drawing Sheets

SPLIT SCREEN IMAGING

This application is a continuation of application Ser. No. 730,201, filed May 3, 1985, now abandoned.

FIELD OF THE INVENTION

This invention is concerned with systems for generating images from data for raster video display and, more particularly, with improving the versatility and flexibility of such systems which split the screen into images to provide a multi-image viewing capability.

BACKGROUND OF THE INVENTION

Imaging systems of the type under discussion such as, for example, medical imaging systems used to provide images for medical diagnostics, generally acquire data, process the data and use the processed data to provide an image or images on a video screen using raster display methods.

The versatility of the system in providing the display image is important for diagnostic purposes. For example, almost all systems now provide "multi-images", that is, more than one image at a time, simultaneously on the video screen. This type of multi-image display is often referred to as a "split screen operation". The images may be of different sections of the body, for example, or different sized images of the same section, or views of the same sections at different times. Part of the screen may be used to display a report (diagrams, text etc.) related to the other images shown on other parts of the screen.

Many functions are performed and many operations may be done in the processing system, in the memory and in the display control system, on the images. Images are zoomed, miniaturized, displayed in cine modes, subtracted in portions, etc. The presently available imaging methods and systems lack versatility when it comes to displaying a relatively large number of images (more than 4) on a video screen. Thus, while many systems do, at the present time, provide "split-screen" operation, these are very limited and rather inflexible.

In the prior art systems, the split screen facility is generally based on either one of the following techniques:

(a) The combination of images to be displayed is stored, under software control, in the display memory. The location, size and other display parameters for each of the images is taken into account during the processing and the thus "edited" image is placed in a corresponding portion of the display memory. The hardware used for display is required only to display the completely edited image and no hardware controls concerned with split screen are used nor required.

(b) Hardware means are built into the display system which support a fixed subdivision of the screen area (i.e one fourth). An attribute control parameter is associated with each of the subdisplays. Thus, some selective control of the subdisplay parameters is available; such as pointer to image address, and priority of display (image, overlay and alphanumerics).

The above prior art techniques are characterized by severe limitations. While the software based system of method (a) is extremely flexible in all display parameters, it requires extensive software processing whenever some change in layout or other display parameter is required. Hence, the response time is normally inadequate for interactive systems. This above described software method also requires larger memory capacity as both the original images and the "edited" images have to be stored in memory, thus duplicating the size of the memory.

The hardware based split screen system (method b) described above is characterized by a complimentary set of characteristics. In other words, for example, its response time is practically instantaneous, making it suitable for interactive operation ("interactive operation" is defined herein as the capability of the imaging system to vary the images responsive to instructions from the system operator on a real time basis) but it is practically devoid of versatility.

It would be highly desirable to increase the versatility of the split screen operations to the point where all the advantages of both prior art methods described above are realized without their shortcomings, i.e.:

The split screen may be partitioned into a large number of subdisplays;

The subdivisions of the screen are readily and speedily variable; hence, the number of images, their shape/boundaries and the position of the images may be instantaneously changed in the course of an interactive viewing of the images;

Once the screen is partitioned, each subdisplay has an independant set of display parameters; such as, address pointer, zoom factor, interpolation enable, scroll, windowing, etc;

The display parameters are available dynamically at video rates; thus, as long as hardware is available for performing any of the image processing steps at the video rate, this processing step may be applied to those of the subdisplays being refreshed at every given instance as the electron beam scans the display during the refresh cycle.

Accordingly, it is an object of the invention to provide extremely versatile and flexible split screen capability in digital display systems.

According to a broad aspect of the present invention, an imaging display system is provided. The system uses video display means providing split screen features, said system comprising:

display memory means for storing data used to construct the images displayed, designation means for designating portions of the display area of the video display means as subdisplay areas. Control means for reading out designated images for display, and associate means for changing contents of the designation means, thereby changing the subdisplay area.

According to a feature of the invention, means are provided for storing the display parameters for each subdisplay together with loading means as required to load the storing means with new sets of parameters, and means for dynamically reading out the parameters for controlling the subdisplay being refreshed.

A further feature of the invention includes means for controlling the operation of the system consistent with the overall specification of the display and its split screen.

According to yet another feature of the invention, data transferring means for use in transferring data from the display memory into the display means are provided. This data transferring means includes the designation means for designating portions of the display area of the video display means as subdisplay areas and directing means for directing data from the memory into a specified subdisplay area from any portion of the memory.

The data transferring means comprises dedicated hardware having a subdisplay map including auxiliary memory means plus control hardware to move the pointers on the original memory as directed by the subdisplay map information. In addition, the control hardware determines or is used in selecting the functions to be performed in the subdisplay, such as zooming, cine, etc.

BRIEF DESCRIPTION OF THE DRAWINGS

The above mentioned and other objects and features of the invention will be better understood when considered in light of the following description of a broad aspect of the invention taken with the following drawings wherein.

GENERAL DESCRIPTION

Figure 1:
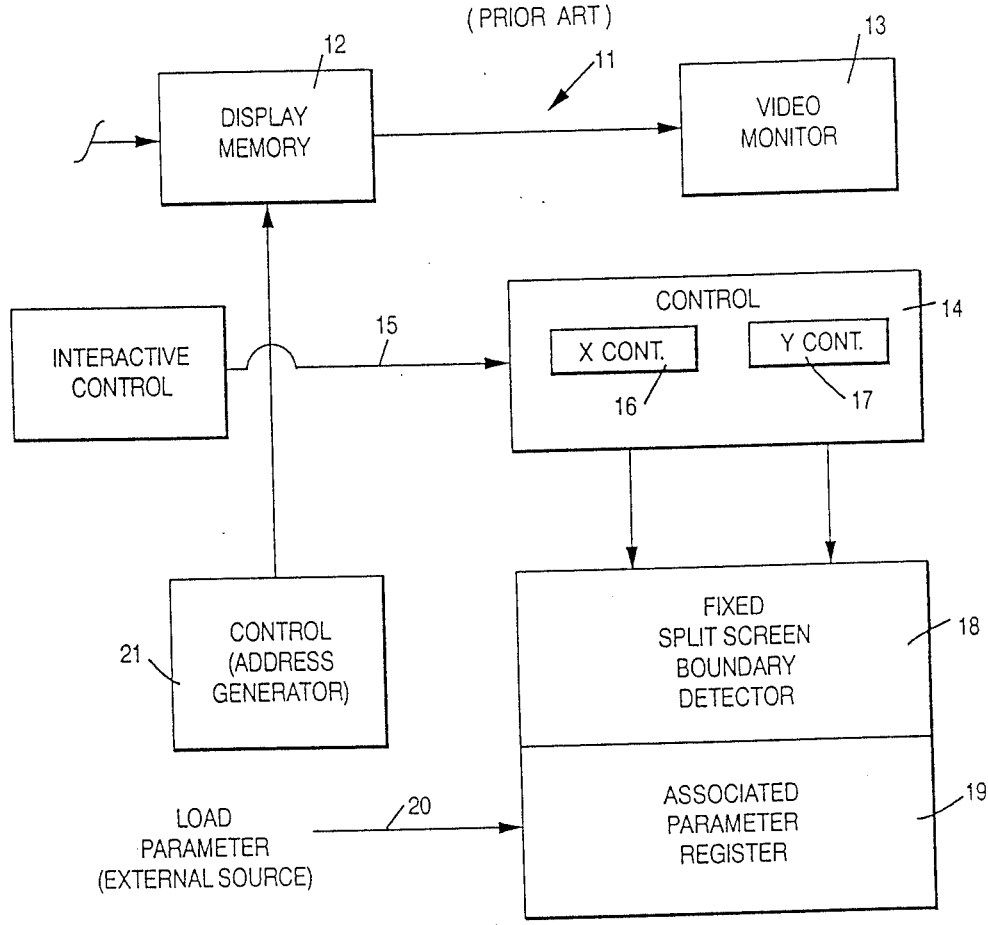
FIG. 1 is a block diagram of a prior art split screen display imaging system.

The prior art split screen display imaging system 11 of FIG. 1 includes a source of image data such as display memory 12. Where the data in the memory originated is not pertinent to this invention. The data in memory 12 is used to generate images on raster video monitor 13 under the control of control means 14. The control means 14 is shown as including means for controlling the location of the display and subdisplay in x and y cartesian coordinate directions. More particularly, x and y controls 16 and 17 respectively are shown.

The X and Y controls work in conjunction with a fixed split screen boundary detector 18 and an associated parameter register 19. An address generator 21 is provided having an input from boundary detector 18 and being coupled to the display memory 12 to cause the display to be within the circumscribed boundaries. The control unit 14 is coupled to the system interactive control over conductor means 15 and the parameter register receives input over conductor means 20.

The control exercised by control unit 14 is severely limited as shown in Fig 1. More particularly, as shown in blocks 18 and 19, the split screen boundary determinations are fixed and the split screen parameters are also fixed, either by hardware as loaded into the control circuit or under software control. The boundary determination and parameter are fed into the display memory at address generator control 21.

Accordingly with prior art split screen systems, the operator interaction was minimal. The operator could choose within a relatively limited choice, the number of subdisplays to be simultaneously displayed. However, the shape and position of the subdisplays which are simultaneously displayed are predetermined and fixed. The location of the image in the subdisplay may also depend on the location of the data in the memory. The zoom and windowing capabilities were generally applicable to all of the subdisplays rather than having controls relating to the subdisplay, independently of one another.

Figure 2:
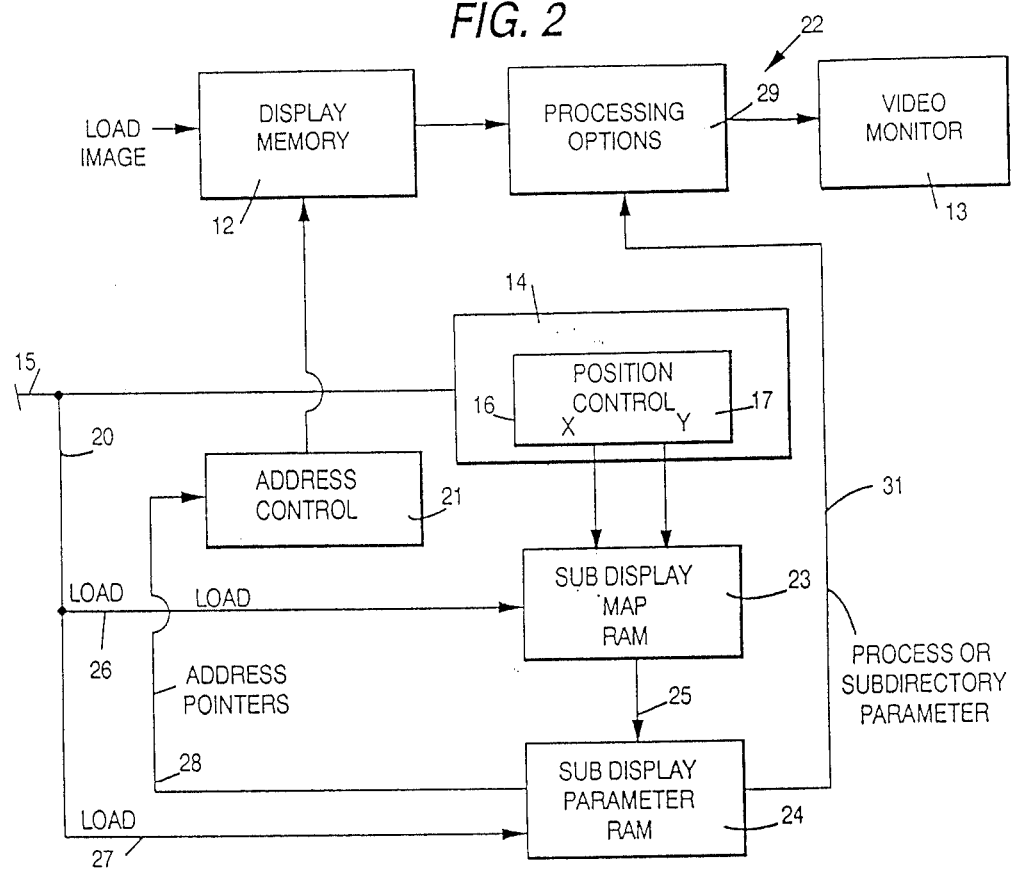
FIG. 2 is a block diagram of the inventive split screen display imaging system, including the inventive data transferring means.

The split screen imaging display system 22 of FIG. 2 highlights the versatility of the inventive system. System 22 comprises a source of image data shown as display memory 12. Note that where units have the same function as the units in FIG. 1, they carry the same designation number. The control unit 14 again includes X and Y position controls 16 and 17. In system 22, the boundaries of the subdisplays are not fixed. Instead, there is provided a subdisplay map means such as RAM 23, which operates along with a variable subdisplay parameter means such as RAM 24.

The map means generally establishes correspondence between the elements of the incoming data and the data elements required or desired for the display. The RAM type map is ideally programmable per display.

The control 14 receives instructions on bus 15 from interactive means (not shown) such as a keyboard, touch system, joystick, etc. The instructions normally are transmitted through a processor.

The map RAM unit 23 is also controlled from the interactive unit through conductors 15, 20 and 26. The parameters in RAM unit 24 are also variable per subdisplay from the interactive unit through conductors 15, 20 and 27. The subdisplay parameter RAM unit 24 is shown coupled to the address control unit 21 through conductor 28. The utilization of the RAM interconnected to the address control enables subdisplays of different sizes and shapes including irregularly shaped subdisplays.

Additional image processing may be provided by processing option unit 29 coupled to subdisplay parameter RAM unit 24 through conductor 31. The processing unit 29 operates on the data between the memory 12 and the video monitor 13.

Figure 3:
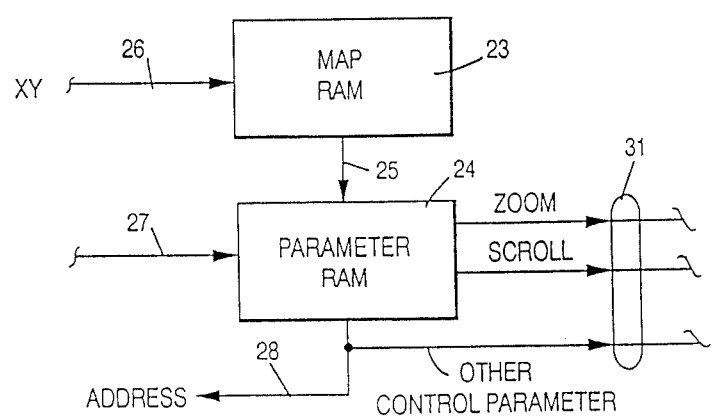
FIG. 3 is a block diagram of the inventive data transferring means.

In FIG. 3, the RAM units 23 and 24 interconnected at 25 are shown to emphasize that the number of subdisplay images, the size of the subdisplay images and the location of the subdisplay images may be uniquely controlled by control signals received from the interactive control means. The system operator using the interactive control means inputs the corresponding subdisplay number in which the specific X,Y block does belong into unit 23 for every X,Y coordinate block information received. The subdisplay parameters are also controlled by the operator, who inputs control signals into RAM unit 24 to control the particular subdisplay designated by unit 23. The capabilities of the system are quick enough to operate on streams of data as well as data in memory.

Thus, for example, the operator can decide that the portion of the image in the upper right hand section of the memory is to be zoomed in the lower left hand portion of the screen of the monitor. The operator feeds the RAM unit 23 with X,Y information that defines where the subdisplay is to be imaged. The information fed into the RAM 24 determines the address of the data to be used as well as what processing options are to be effected. Accordingly, an extremely versatile multi-imaging system is provided with means for independently controlling each of the multi-images. The system uses a minimum of time and equipment.

While the invention has been described using particular embodiments, it should be realized that the embodiments are used by way of example and not as limitations on the scope of the invention.

What is claimed is:

1. A split screen image display system capable of displaying a plurality of sub-display images each having different locations, shapes, sizes and processing parameters, said split screen image display system comprising:
   image display means, display memory means containing imaging data, said display memory means having a number of memory locations substantially equal to the number of pixels of said image display means, processing means for processing said imaging data obtained directly from said display memory means to generate images on said image display means from said imaging data, readout means for reading out said display memory means to provide said imaging data directly to said processing means, a first random access memory (RAM) means providing instructions for determining the location of said imaging data in each of said sub-display images on said image display means, a second RAM means for providing instructions specifying the location in the memory means of the data being read out and for providing instructions specifying processes to be utilized by the processing means to determine the size and shapes of each of the sub-display images, and external interactive means for inputting said location and processing information into said first and second RAM means to designate desired split screen sub-display images.

2. The split screen image display means of claim 1 wherein said first RAM means comprises a first RAM programmed to provide a display map, said first RAM means operated responsive to the inputted location information for controlling the location of each of the sub-display images of information in said display memory means located under the control of information from said second RAM means, and said second RAM means providing operating parameters to determine processes to be utilized by said processing means responsive to said inputted information.

3. The system of claim 2 wherein said processing means operates responsive to said instruction from said second RAM means to process amplitude values stored in said display memory means prior to inserting said processed values onto locations determined by said first RAM means.

* * * * *